(12) United States Patent
Binder et al.

(10) Patent No.: US 10,543,591 B2
(45) Date of Patent: Jan. 28, 2020

(54) MACHINE TOOL

(71) Applicant: Hilti Aktiengesellschaft, Schaan (LI)

(72) Inventors: Albert Binder, Buchs (CH); Michael Wierer, Roethis (AT); Christoph Hakenholt, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 1073 days.

(21) Appl. No.: 13/918,683

(22) Filed: Jun. 14, 2013

(65) Prior Publication Data

US 2013/0333909 A1 Dec. 19, 2013

(30) Foreign Application Priority Data

Jun. 15, 2012 (DE) .................... 10 2012 210 088

(51) Int. Cl.
  *B25D 11/06* (2006.01)
  *B25D 17/24* (2006.01)

(52) U.S. Cl.
  CPC .......... *B25D 11/064* (2013.01); *B25D 17/245* (2013.01)

(58) Field of Classification Search
  CPC .... B25D 11/064; B25D 13/00; B25D 17/245; B25D 17/24; B25D 11/06; H02K 33/12; H02K 35/00; H02K 35/02; H01F 2007/1692; H01F 7/1615
  USPC .......... 173/17, 117, 212, 1, 2, 114, 202, 128
  See application file for complete search history.

(56) References Cited

U.S. PATENT DOCUMENTS

| | | | |
|---|---|---|---|
| 1,429,094 A | | 9/1922 | Paulero |
| 1,651,793 A | * | 12/1927 | Weyandt ............... H02K 33/12 310/30 |
| 1,753,454 A | * | 4/1930 | Weyandt ............... H02K 33/12 310/30 |

(Continued)

FOREIGN PATENT DOCUMENTS

| | | |
|---|---|---|
| CN | 1255416 A | 6/2000 |
| CN | 201970286 U | 9/2011 |

(Continued)

OTHER PUBLICATIONS

Chinese Office Action issued in counterpart Chinese Application No. 201310233615.4 dated Sep. 30, 2015, with partial English translation (Thirteen (13) pages).

(Continued)

*Primary Examiner* — Gloria R Weeks
*Assistant Examiner* — Dariush Seif
(74) *Attorney, Agent, or Firm* — Crowell & Moring LLP

(57) ABSTRACT

A machine tool is disclosed. A magneto-pneumatic striking mechanism has a primary actuator arranged around an axis of movement and includes a first magnetic coil and a second magnetic coil. The striking mechanism has, on the axis of movement within the magnetic coils, a striker and a die. Furthermore, the striking mechanism has an air spring acting on the striker in a direction of impact. The air spring may be entirely or partially within the first magnetic coil. The air spring has a ventilation opening that is open to the environment if the striker is less than 10% of its stroke away from the die, and otherwise the ventilation opening is closed. An exchange of air with the environment is therefore only possible when the striker is near the die or is near the impact position.

14 Claims, 4 Drawing Sheets

(56) References Cited

U.S. PATENT DOCUMENTS

| | | | | |
|---|---|---|---|---|
| 1,797,253 | A * | 3/1931 | Weyandt | H02K 33/12 318/125 |
| 2,638,749 | A * | 5/1953 | Sparano | B25D 11/125 173/138 |
| 2,861,778 | A * | 11/1958 | Spurlin | B25D 11/064 173/117 |
| 2,892,140 | A * | 6/1959 | Praeg | B25D 11/064 318/128 |
| 3,054,464 | A * | 9/1962 | Ondeck | B25D 11/064 173/117 |
| 4,004,258 | A * | 1/1977 | Arnold | F16K 31/082 137/554 |
| 4,015,671 | A * | 4/1977 | Borisov | B25D 11/064 173/117 |
| 4,236,588 | A | 12/1980 | Moeldan et al. | |
| 4,237,987 | A * | 12/1980 | Sherman | B25D 11/064 173/117 |
| 4,290,492 | A * | 9/1981 | Sides | B25D 11/005 173/118 |
| 4,466,851 | A * | 8/1984 | Hoffman | B25B 27/0028 156/761 |
| 4,779,582 | A * | 10/1988 | Lequesne | F01L 9/04 123/90.11 |
| 4,785,210 | A | 11/1988 | Maruyama et al. | |
| 5,050,687 | A * | 9/1991 | Prokhorov | B25D 9/04 173/104 |
| 5,088,566 | A * | 2/1992 | Gustafsson | B25D 11/125 173/200 |
| 5,099,926 | A * | 3/1992 | Fushiya | B25D 11/005 173/17 |
| 5,497,555 | A * | 3/1996 | Averbukh | B25D 11/064 173/117 |
| 6,073,705 | A * | 6/2000 | Shibata | B25D 17/088 173/200 |
| 6,808,026 | B2 * | 10/2004 | Berger | B25D 9/04 173/109 |
| 7,726,414 | B2 * | 6/2010 | Berger | B25D 11/005 173/132 |
| 7,926,584 | B2 * | 4/2011 | John | B25D 11/005 173/1 |
| 7,967,078 | B2 * | 6/2011 | Aoki | B25D 17/24 173/109 |
| 9,969,073 | B2 * | 5/2018 | Ontl | B25D 17/06 |
| 2002/0014344 | A1 * | 2/2002 | Geiger | B25D 11/064 173/114 |
| 2003/0083186 | A1 * | 5/2003 | Hetcher | B25D 11/005 493/464 |
| 2004/0177981 | A1 * | 9/2004 | Berger | B25D 11/005 173/201 |
| 2010/0206593 | A1 * | 8/2010 | Schad | B25D 11/064 173/128 |
| 2010/0236802 | A1 | 9/2010 | Berger et al. | |
| 2011/0108301 | A1 * | 5/2011 | Erhardt | B25D 11/005 173/200 |
| 2011/0303431 | A1 * | 12/2011 | Hartmann | B25D 11/005 173/114 |
| 2012/0024555 | A1 * | 2/2012 | Sugiyama | B25D 17/06 173/211 |

FOREIGN PATENT DOCUMENTS

| | | |
|---|---|---|
| DE | 94 13 686 U1 | 1/1995 |
| DE | 198 55 750 A1 | 6/2000 |
| DE | 10 2005 030 340 B3 | 1/2007 |
| DE | 10 2007 000 386 A | 1/2009 |
| DE | 10 2009 000 363 A1 | 7/2010 |
| EP | 0 779 698 B1 | 6/1997 |
| EP | 2 043 238 A1 | 4/2009 |
| FR | 540.425 A | 7/1922 |
| GB | 13716 A | 7/1911 |
| JP | 54-11001 A | 1/1979 |
| JP | 55-134178 U | 9/1980 |
| JP | 2000-167783 A | 6/2000 |
| JP | 2002-11676 A | 1/2002 |
| JP | 2008-194820 A | 8/2008 |
| JP | 2008-544871 A | 12/2008 |
| JP | 2010-167558 A | 8/2010 |

OTHER PUBLICATIONS

European Search Report dated Oct. 7, 2013, with Statement of Relevancy (Eight (8) pages).
German Search Report, dated Feb. 15, 2013, 5 pages.
Japanese Notice of Reasons for Refusal issued in Japanese counterpart application No. 2013-124768 dated Mar. 22, 2017, with partial English translation (Ten (10) pages).

* cited by examiner

MACHINE TOOL

This application claims the priority of German Patent Document No. DE 10 2012 210 088.1, filed Jun. 15, 2012, the disclosure of which is expressly incorporated by reference herein.

BACKGROUND AND SUMMARY OF THE INVENTION

The present invention relates to a machine tool capable of driving a chiseling tool. A striker is accelerated directly by magnetic coils and strikes the tool. Machine tools of this type are known, for example, from U.S. Patent Application Publication No. US 2010/0206593.

The machine tool according to the invention has a tool holder which is set up to store a chiseling tool so that it can move along an axis of movement. A magneto-pneumatic striking mechanism has a primary actuator, which is arranged around the axis of movement, and sequentially includes a first magnetic coil and a second magnetic coil in the direction of impact. The striking mechanism is on the axis of movement within the magnetic coil, and in the direction of impact a striker and a die are sequentially arranged. Furthermore, the striking mechanism has an air spring which acts on the striker in the direction of the impact. The air spring may be wholly or partially within the first magnetic coil. The air spring has a ventilation opening which is open to the environment when the striker is at a distance of less than 10% of its stroke from the die, and otherwise the ventilation opening is closed. The ventilation opening is preferably the only opening of the pneumatic chamber forming the air spring to the environment. An exchange of air with the environment is therefore only possible when the striker is close to the die and the impact position. To determine the distance, the die is assumed to be in its home position. In the home position, the die is preferably opposite the direction of impact at a stop.

One embodiment provides that the ventilation opening of the air spring is arranged at the axial height of the end of the first magnetic coil pointing in the direction of impact. The ventilation opening is significantly closer to the end of the first magnetic coil pointing in the direction of impact than to the end pointing opposite the direction of impact. The striker may block the ventilation opening, for example, with its lateral surface. Specifically, when the striker advantageously overlaps with the first magnetic coil at every position.

One embodiment provides that a surface cross-section of the ventilation opening is designed such that with a pressure difference of 0.5 bar, at most 10% of the amount of air in the air spring flows through the ventilation opening in one second. The exchange of air through the ventilation opening is small. Ultimately, only losses in the air spring are supposed to be equalized, which emanate, for example, through leakage during the compression of the air spring. The ventilation opening can be realized by a single hole or a plurality of holes and/or slots located at approximately the same height.

One embodiment provides that the air spring is closed off by a stationary seal which is opposite to the direction of impact. The stationary seal is immobile with respect to the magnetic coil, the tool holder, etc. The pneumatic chamber of the pneumatic spring is insulated from the environment except for a ventilation opening. The ventilation opening is at the axial height of the end of the first magnetic coil facing the ring magnet.

One embodiment provides that a permanent and radially magnetized ring magnet is arranged between the first coil and the second coil. The ring magnet is composed, for example, of permanent magnets, with the respective same magnetic pole (N) of each facing of the axis of movement and with the other magnetic pole (S) facing away from the axis of movement. The ring magnet essentially generates a magnetic field which is permanently oriented to the axis movement and runs along the radial direction, and which runs in the opposite direction within the first magnetic coil and the second magnetic coil. This asymmetry can be used to set the magnetic field strength within the two coils in phase opposition to a high and a low value. The gradient of the magnetic field strength moves the striker based on the magnetic reluctance. The magnetic coils can be controlled by a controller in alternating phases. A magnetic field generated by the first magnetic coil within the first magnetic coil is super-positioned on the magnetic field of the ring magnet constructively in a first phase and destructively in a second phase. A second magnetic field generated by the second magnetic coil within the second magnetic coil is super-positioned on the magnetic field of the ring magnet destructively in the first phase and constructively in the second phase.

One embodiment provides that the die be of a soft magnetic material. The die extends into the second magnetic coil or into a yoke placed into the second coil in the direction of impact. The magnetizable die guides the magnetic field. The magnetic field generated by the second magnetic coil occurs substantially parallel to the direction of impact from the die, i.e., it is substantially perpendicular to the face of the die. The magnetic field generated by the ring magnet also occurs substantially perpendicular to the face of the die. This enables a high field strength near the face.

DETAILED DESCRIPTION OF THE DRAWINGS

Figure 1:
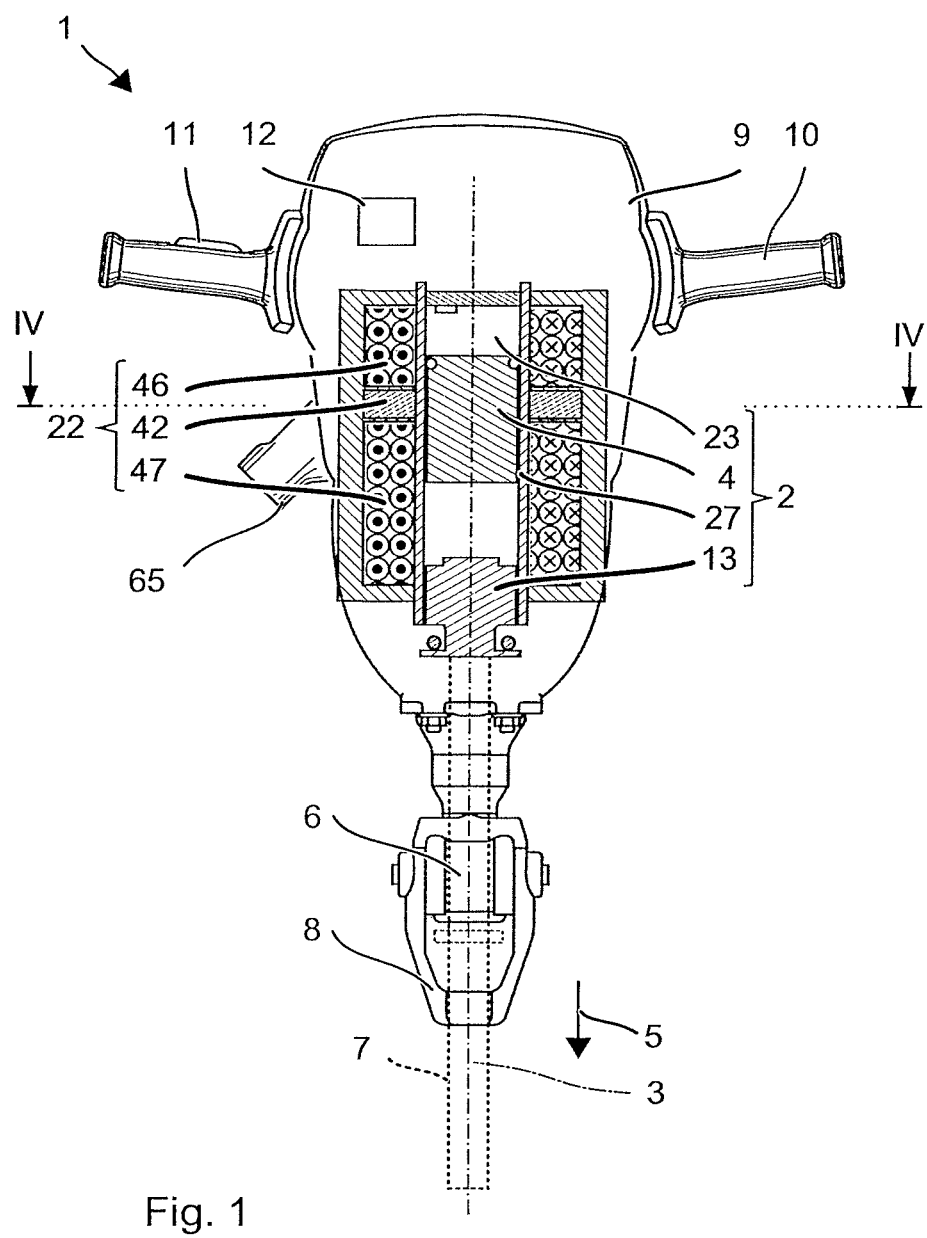
FIG. 1 illustrates an electric chisel.

Identical or functionally similar elements are indicated by like reference numerals in the Figures, unless otherwise stated.

FIG. 1 shows a hand-held electrically powered chisel 1 as an example of a chiseling machine tool. A magneto-pneumatic striking mechanism 2 produces, by a striker 4 guided on an axis of movement 3, periodic or aperiodic strikes in a direction of impact 5. A tool holder 6 holds a chiseling tool 7 placed on the axis of movement 3 of the striking mechanism 2. The chiseling tool 7 is guided along the axis of movement 3 in the tool holder 6 and can be driven in the direction of impact 5 by the strikes into, for example, an underlying surface. A locking mechanism 8 limits axial movement of the chiseling tool 7 in the tool holder 6. The locking mechanism 8 is, for example, a swivel bracket and can preferably be manually unlocked without the aid of tools in order to replace the chiseling tool 7.

The striking mechanism 2 is arranged in a machine housing 9. A handle 10 mounted on the machine housing 9 enables the user to hold the electric chisel 1 and to guide it during operation. A system switch 11, with which the user can operate the striking mechanism 2, is preferably mounted on the handle 10. The system switch 11 activates, for example, a controller 12 for the striking mechanism 2.

Figure 2:
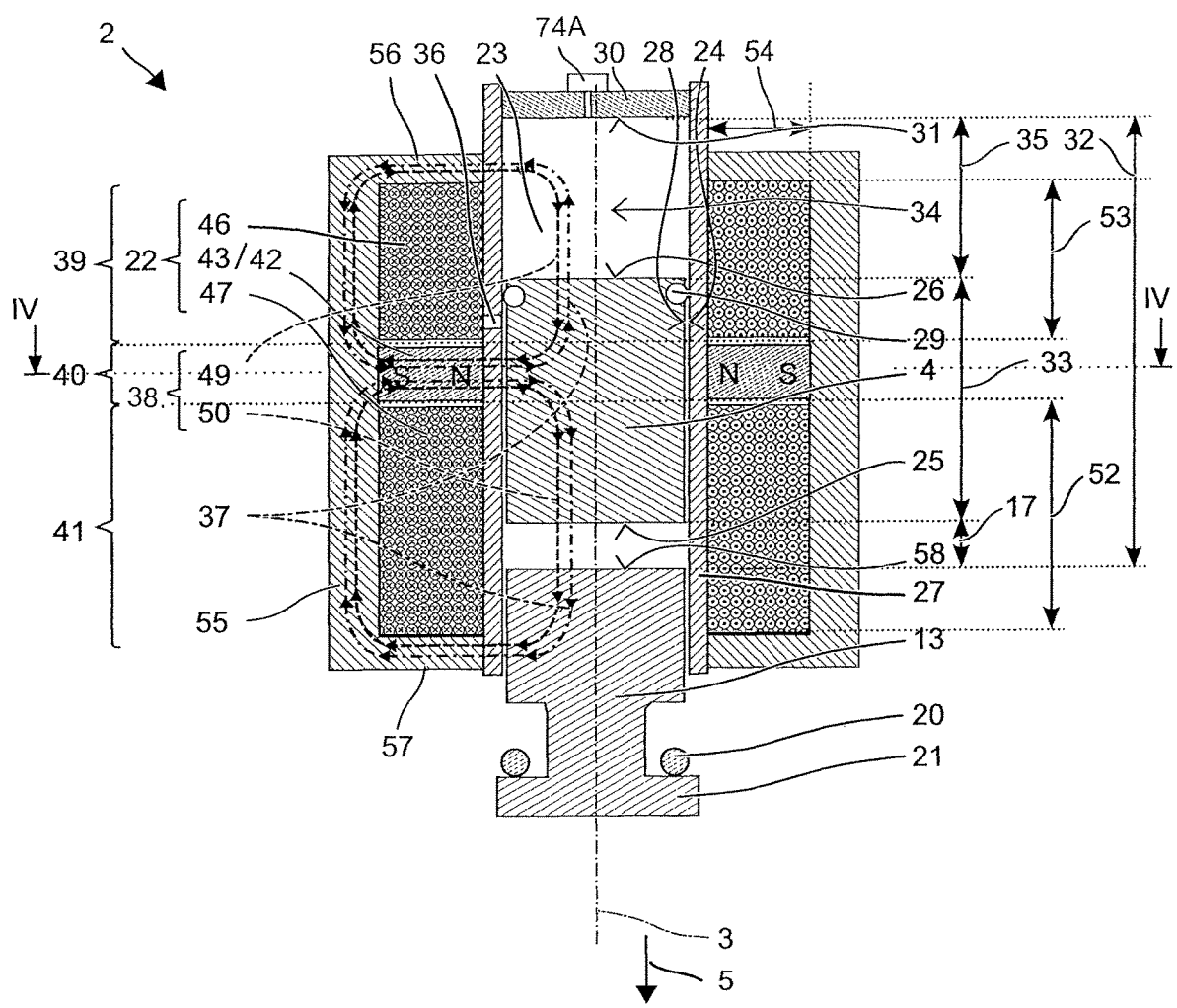
FIG. 2 is a cross-section of a striker mechanism of the electric chisel.

FIG. 2 shows a longitudinal section of the magneto-pneumatic striking mechanism 2. The striking mechanism 2 has only two moving components: a striker 4 and a die 13. The striker 4 and the die 13 are located on the common axis of movement 3, and the die 13 follows the striker 4 in the direction of impact 5. The striker 4 moves in a reciprocating fashion between an impact point 14 and an upper turning point 15 on the axis of movement 3.

At the impact point 14 the striker 4 strikes the die 13. The position of the impact point 14 along the axis is defined by the die 13. The die 13 preferably rests in its home position 16 and preferably returns after each impact to this home position 16 before the striker 4 strikes the die 13 the next time. This preferred mode of operation is assumed for the following description. However, the magneto-pneumatic striking mechanism 2, in contrast to a conventional pneumatic striking mechanism 2, has a high tolerance compared to the actual position of the die 13. For a strike it can even be displaced in the direction of impact 5 compared to the home position 16. The home position 16 thus provides the earliest position along the direction of impact 5 at which the striker 4 can strike the die 13.

Figure 3:
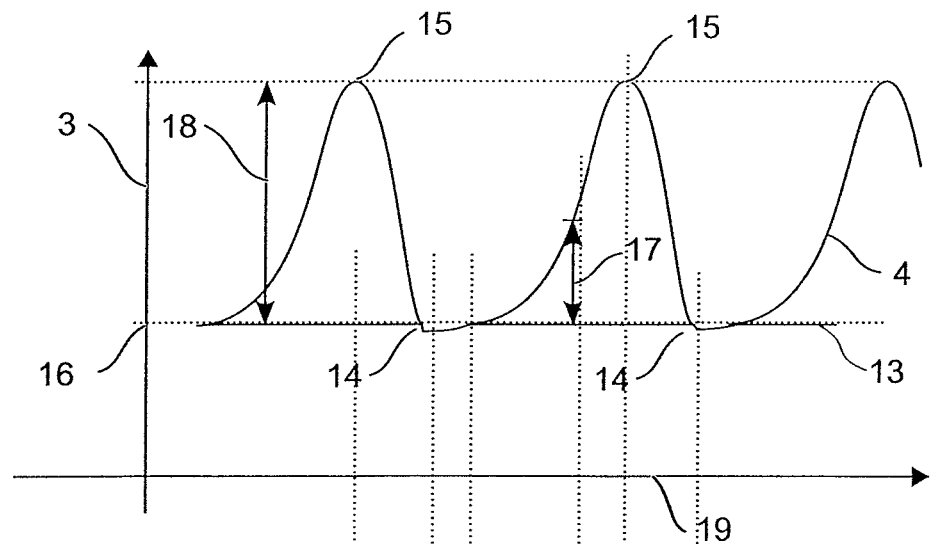
FIG. 3 illustrates a movement of the striker and die.

The distance 17 of the striker 4 to the die 13 is largest at the upper turning point 15, while the distance traveled by the striker 4 is hereinafter referred to as the stroke 18. FIG. 3 schematically illustrates the movement of the striker 4 and the die 13 in three successive strikes over time 19.

In its resting position the striker 4 usually rests on the die 13. For a strike, the striker 4 is moved back against the direction of impact 5 and accelerated in the direction of impact 5 after reaching the upper turning point 15. The striker 4 rebounds at the end of its movement in the direction of impact 5 at the impact point 14 on the die 13. The die 13 receives considerably more than half of the kinetic energy of the striker 4 and is deflected in the direction of impact 5. The die 13 pushes the chiseling tool 7 abutting it forward in the direction of impact 5 into the underlying surface. The user presses the striking mechanism 2 in the direction of impact 5 against the underlying surface, causing the die 13 to be pushed back, preferably indirectly by the chiseling tool 7, to its home position 16. The die 13, in the home position in the direction of impact 5, abuts a stop 20 fixed to the housing. The stop 20 may comprise, for example, a damping element. The exemplary die 13 has radially projecting wings 21 which can abut the stop 20.

The striker 4 is driven contact-free by a magnetic primary actuator 22. The primary actuator 22 raises the striker 4 opposite to the direction of impact 5. As explained below, the primary actuator 22 is preferably only temporarily active during raising of the striker 4 to the upper turning point 15. The primary actuator 22 accelerates the striker 4 after passing the upper turning point 15 until reaching the impact point 14. The primary actuator 22 may be activated about the same time as the upper turning point 15 is passed. Preferably, the primary actuator 22 remains active until the impact. An air spring 23 supports the primary actuator 22 during the movement of the striker 4 in the direction of impact 5, from the upper turning point until just prior to the impact point.

The air spring 23 is positioned on the axis of movement 3 in the direction of impact 5 in front of the striker 4 and acting on the striker 4.

The striker 4 is made mainly of a cylindrical body whose lateral surface 24 is parallel to the axis of movement 3. A front face 25 points in the direction of impact 5. The front face 25 is flat and covers the entire cross-section of the striker 4. A rear surface 26 is also preferably planar. The striker 4 is inserted into a guide tube 27. The guide tube 27 is coaxial with the axis of movement 3 and has a cylindrical inner wall 28. The lateral surface 24 of the striker 4 abuts the inner wall 28. The striker 4 is positively guided in the guide tube 27 on the axis of movement 3. A cross-section of the striker 4 and a hollow cross-section of the guide tube 27 are precisely adjusted so that there is as little play as possible between them. The striker 4, in the same manner as a flying seal, closes off the guide tube 27. A sealing ring 29 made of rubber can be used in the outer surface 24 to compensate for manufacturing tolerances.

The guide tube 27 is closed at its front end in the direction of impact 5. In the exemplary embodiment, a seal 30 is inserted into the guide tube 27, whose cross-section corresponds to the hollow cross-section of the guide tube 27. The inwardly oriented sealing surface 31 is preferably planar and perpendicular to the axis of movement 3. The seal 30 is mounted at a fixed distance 32 from the stationary die 13 in the home position 16. The hollow space between the seal 30 and the die 13, in the home position 16, is the range of the guide tube 27 effective for the striker 4, within which the striker 4 can move. The maximum stroke 18 is essentially the distance 32 less the length 33 of the striker 4.

The guide tube 27 which is closed at one end and the striker 4 complete a pneumatic chamber 34. The volume of the pneumatic chamber 34 is proportional to the distance 35 between the sealing surface 31 and the rear face 26 of the striker. The volume is variable due to the motion of the striker 4 along the axis of movement 3. The air compressed or decompressed by movement in the pneumatic chamber 34 provides the action of the air spring 23. The pneumatic chamber 34 takes on its maximum volume at point of impact 14, i.e., when the striker 4 strikes the die 13. The pressure in the pneumatic chamber 34 is at its lowest here, and advantageously equal to the ambient pressure. The potential energy of the air spring 23 at the point of impact 14 is defined as zero. The lowest volume is achieved by the pneumatic chamber 34 at the upper turning point 15 of the striker 4; the pressure may rise to about 16 bar. The stroke of the striker 4 is limited by a control method, in order to adjust the volume and pressure of the pneumatic chamber 34 at the upper turning point 15 to a target value. The potential energy of the air spring 23 at the upper turning point 15 should be within a narrow range of values, independent of external influences. In particular, hereby the striking mechanism 2 is robustly against the position of the die 13 during the impact, although its position has a major influence on the flight time of the striker 4 to the upper turning point 15.

The air spring 23 is provided with one or more ventilation openings 36, to compensate for losses of the amount of air in the air spring 23. The ventilation openings 36 are sealed during the compression of the air spring 23 by the striker 4. Preferably, the striker 4 releases the ventilation openings 36 just before the point of impact 14 when the pressure in the air spring 23 differs by less than 50% from the ambient pressure. In the exemplary embodiment, the striker 4 will travel past the one ventilation opening 36 when it has moved more than 5% of its stroke 18 away from the impact position.

The primary actuator 22 is based on magnetic reluctance forces which act upon the striker 4. The main body of the striker 4 is made of a soft magnetic steel. Compared with a permanent magnet, the striker 4 is characterized in that it has a low coercivity of less than 4000 A/m, preferably less than 2500 A/m. An external magnetic field with this low field strength can even reverse the polarity of the striker 4. An externally applied magnetic field attracts the magnetizable striker 4 in the areas of maximum field strength, regardless of its polarity.

The primary actuator 22 has a hollow space along the axis of movement 3, into which the guide tube 27 is inserted. The primary actuator 22 creates a permanent magnetic field 37 in the hollow space and a two-part switchable magnetic field 38 within the guide tube. The magnetic fields 37 and 38 divide the hollow space and the effective area of the guide tube 27 along the axis of movement 3 into an upper section 39, a middle section 40 and a lower section 41. The field lines of the magnetic fields 37, 38 extend substantially parallel to the axis of movement 3 in the upper section 39 and lower section 41, and substantially perpendicular to the axis of movement 3 in the middle section 40. The magnetic fields 37 and 38 differ in their orientation parallel or anti-parallel to the field lines of the direction of impact 5. The exemplary field lines depicted in fragmentary form (dot-patterns) of the permanent magnetic field 37 extending in the upper section 39 of the guide tube 27 run substantially anti-parallel to the direction of impact 5 and in a lower section 41 of the guide tube 27 substantially parallel to the direction of impact 5. For the function of the striking mechanism 2, the different running direction of the field lines of the permanent magnetic field 37 in the upper section 39 compared to the running direction of the bottom section 41 is substantial. During one phase, the field lines of the switchable magnetic field 38 (shown dotted) run within the upper section 39 and lower section 41 of the guide tube 27 substantially in the direction of impact 5, and for a different phase (not shown) within both sections 39, 41 they run substantially antiparallel to the direction of impact 5. The permanent magnetic field 37 and the switchable magnetic field 38 are thus super-positioned destructively in one of the two sections 39 and in the other section 41 are constructively super-positioned. In which of the sections 39, 41 the magnetic fields 37, 38 are super-positioned constructively depends on the current switching cycle of the controller 12. The striker 4 is drawn into each section 39, 41 with constructive super-positioning. An alternating polarity reversal of the switchable magnetic field 38 actuates the reciprocating movement of the striker 4.

Figure 4:
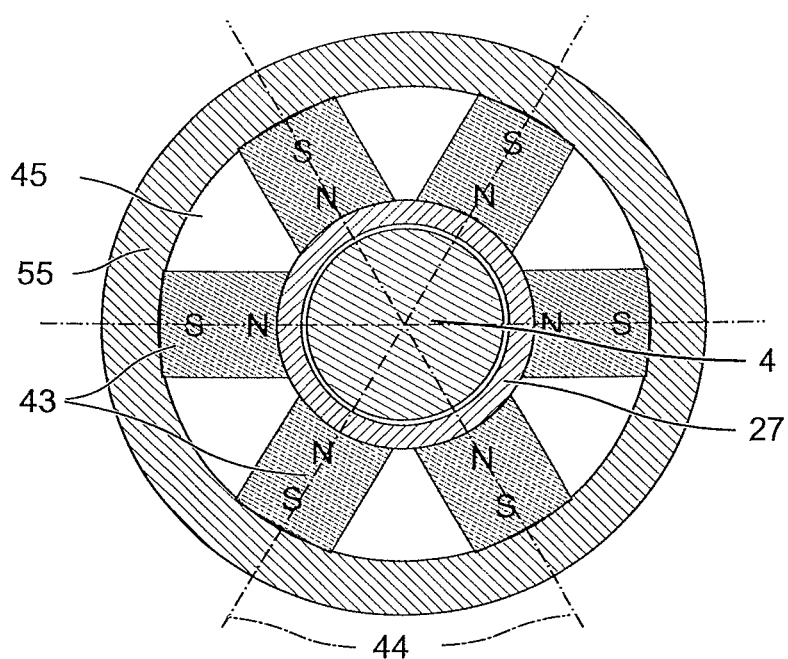
FIG. 4 is a cross-section through the striker mechanism in the plane IV-IV of FIG. 2.

The permanent magnetic field 37 is generated by a radially magnetized ring magnet 42 from a plurality of permanent magnets 43. FIG. 4 shows the ring magnet 42 in a section in the plane IV-IV. The exemplary permanent magnets 43 are preferably bar magnets. The permanent magnets 43 are oriented in the radial direction. Their magnetic axes 44, i.e., from the south pole to north pole, are perpendicular to the axis of movement 3. The permanent magnets 43 are all oriented the same way; in the presented example their north pole N points to the axis of movement 3, and the south pole points away from the axis of movement 3. In the circumferential direction between the permanent magnets 43 there may be an air gap or a non-magnetizable material 45, e.g., plastic. The ring magnet 42 is arranged along the axis of movement 3 between the sealing surface 31 and the die 13. Preferably, the ring magnet 42 is arranged asymmetrically, in particular closer to the sealing surface 31 than to the die 13. The position of the ring magnet 42 divides the guide tube 27 along the axis of movement 3 into an upper section 39 arranged in the direction of impact 5 in front of the ring magnet 42, and a lower section 41 which is oriented from the ring magnet 42 in the direction of impact 5. The field lines in the upper section 39 run substantially in the opposite direction of field lines in the lower section 41. The permanent magnets 43 preferably contain an alloy of neodymium. The field strength at the poles of the permanent magnets 43 is preferably above 1 Tesla, e.g., up to 2 Tesla.

Figure 5:
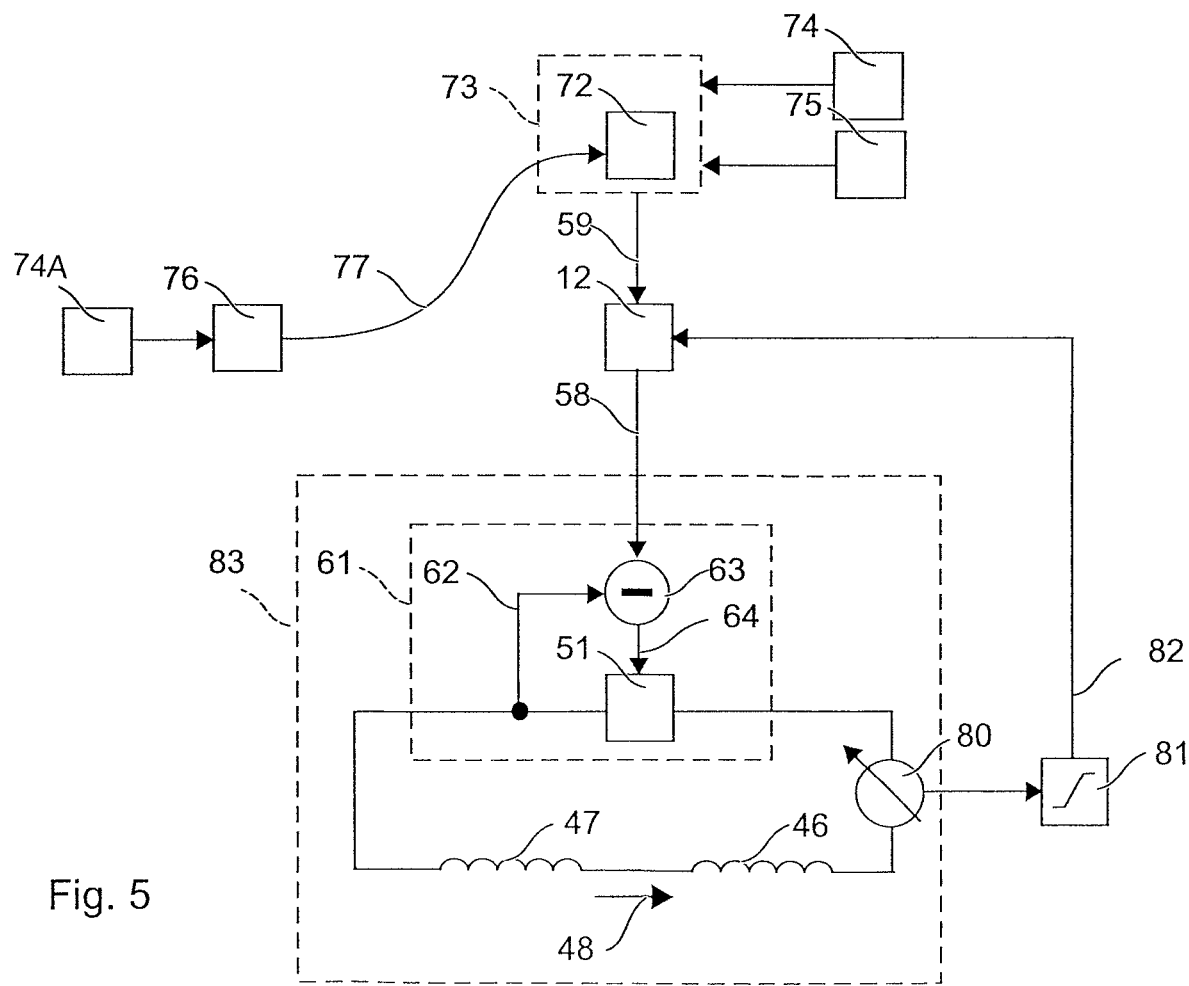
FIG. 5 illustrates an electrical switching mechanism of the striker mechanism.

The switchable magnetic field 38 is produced with an upper magnetic coil 46 and a lower magnetic coil 47. The upper magnetic coil 46 is arranged in the direction of impact 5 in front of the ring magnet 42, preferably immediately adjacent to the ring magnet 42. The upper coil 46 surrounds the upper section 39 of the guide tube 27. The lower magnetic coil 47 is arranged in the direction of impact 5 from the ring magnet 42, preferably abutting the ring magnet, and enclosing the lower section 41. An electrical current 48 will flow through the two magnetic coils 46, 47 in the same circumferential direction about the axis of movement 3. The upper magnetic field 49 produced by the upper magnetic coil 46, and the lower magnetic field 50 produced by the magnetic coil 47 are substantially parallel to the axis of movement 3, and both are oriented in the same direction along the axis of movement 3, i.e., the field lines of the two magnetic fields 49, 50 within the guide tube 27 run either in the direction of impact 5 or run opposite the direction of impact 5. The current 48 is fed from a controllable current source 51 to the magnetic coils 46, 47. Preferably, the two magnetic coils 46, 47 and the current source 51 are connected in series (FIG. 5).

A length 52, i.e., the dimension along the axis of movement 3, of the lower magnetic coil 47, is preferably greater than the length 53 of the upper magnetic coil 46; the ratio of lengths is in the range 1.75:1 to 2.25:1. The respective contributions of the magnetic coils 46, 47 to the field strength of the upper magnetic field 49 or to the field strength of the lower magnetic field 50 within the guide tube 27 are preferably equal. The ratio of the number of windings of the upper magnetic coil 46 to the number of windings of the lower magnetic coil 47 may correspond to the ratio of lengths. The radial dimensions 54 and a current density per unit of area are preferably equal for both magnetic coils 46, 47 (without the other components of the striking mechanism).

A magnetic yoke 55 can conduct the magnetic fields 37, 38 to outside the guide tube 27. The yoke 55 has, for example, a hollow cylinder or a cage of several ribs extending along the axis of movement 3, which surrounds the two magnetic coils 46, 47 and the ring magnet 42 consisting of permanent magnets 43. An annular upper end 56 of the yoke 55 covers the upper magnetic coil 46 from the direction opposite to the direction of impact 5. An annular lower end 57 is adjacent at the height of the die 13 to the guide tube 27. The lower end 57 covers the lower magnetic coil 47 in the direction of impact 5. The magnetic fields 37, 38 are guided in the upper section 39 and lower section 41 in parallel or anti-parallel to the axis of movement 3. The magnetic fields 37, 38 are fed in a radial direction by the yoke 55, in particular the annular ends 56, 57. A radial return occurs substantially in the lower section 41 within the die 13. The field lines are thus preferably substantially perpendicular to the face 26 of the striker 4 and the impact surface 58 of the die 13. The radial recirculation in the upper section 39 can occur unguided, i.e., through the air, into the yoke 56.

The magnetic yoke 55 is made of a magnetizable material, preferably of magnetic sheet metal. The guide tube 27 is not magnetizable. Suitable materials for the guide tube 27 include stainless steel, aluminum, or alternatively, plastics. The seal 30 of the guide tube 27 is preferably made of a non-magnetizable material.

The striker 4 preferably overlaps in each of its positions with both magnetic coils 46, 47. Specifically, the rear face 26 extends into the upper coil 46 when the striker 4 is applied to the die 13, or at least up to the ring magnet 42. The rear face 26 projects at least over the axial center of the ring magnet 42. The ventilation opening 36 of the pneumatic chamber 34 is arranged at the axial height of one of the ends of the upper magnetic coil 46 which faces the ring magnet 42. The spacing to the ring magnet 42 is preferably less than 1 cm.

A controller 12 of the striking mechanism 2 controls the power source 51. The power source 51 sets its output current 48 at a setpoint 60 predetermined by the controller 12 via a control signal 59. The power source 51 preferably includes a control circuit 61, to stabilize the current output 48 at the setpoint 60. A tap measures the actual power 62. From the actual current 48 and the setpoint 60, a differential amplifier 63 forms a control variable 64, which is supplied to the power source 51 for controlling the power output. The power source 51 is fed by a power supply 65, such as a network connection or a battery pack.

Figure 6:
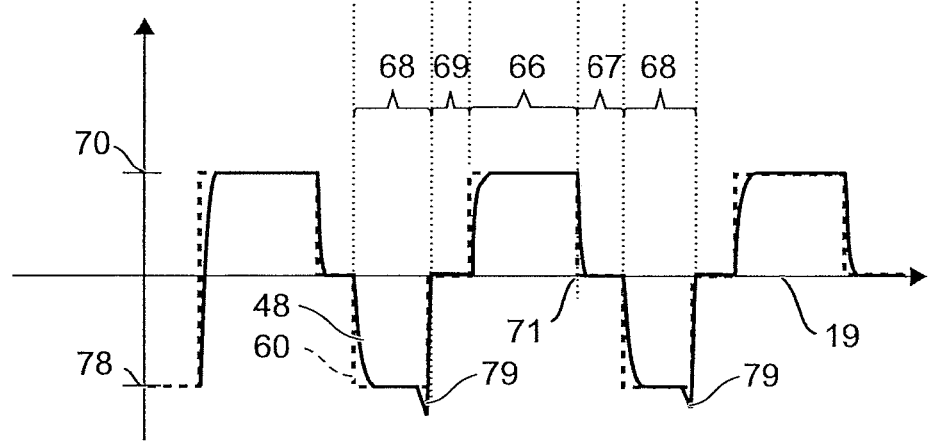
FIG. 6 is a control chart.

The controller 12 switches the setpoint 60 and, indirectly, the current 48 during a reciprocating movement of the striker 4. FIG. 6 illustrates an example of a repetitive switching pattern over time 19. The switching pattern is essentially divided into three distinct phases. A cycle starts with an active recovery phase 66. During the active recovery phase 66, the striker 4 is accelerated against the direction of impact 5, starting from the impact position. The active recovery phase 66 ends when the air spring 23 has reached a predetermined potential energy. A resting phase 67 directly follows the active recovery phase 66, which ends when the striker 4 reaches the upper turning point 15. When or after the striker 4 passes the upper turning point 15, the acceleration phase 68 begins. During the acceleration phase 68 the striker 4 is accelerated in the direction of impact 5, preferably continuously until the striker 4 strikes the die 13. Depending on the desired impact frequency a pause 69 will follow the acceleration phase 68, before the next active recovery phase 66 begins.

The controller 12 initiates a new impact with an active recovery phase 66. The controller 12 gives the controlled current source 51 an initial value 70 as a setpoint 60. The sign of the first value 70 determines that the current 48 circulates in the magnetic coil 47 such that the magnetic field 49 of the upper magnetic coil 46 is constructively super-positioned with the permanent magnetic field 37 in the upper section 39 of the guide tube 27. In the upper section of 39, the striker 4 is now accelerated against the direction of impact 5 and against a force of the air spring 23.

The kinetic energy of the striker 4 is continuously increasing. Due to the rearward movement, the air spring 23 is simultaneously compressed and the potential energy stored in it increases due to the performed work.

The current 48 preferably passes through both magnetic coils 46, 47. Preferably, the magnetic fields 37, 38 are super-positioned destructively in the lower section 41. The magnitude of the first value 70 may be selected such that the magnetic field 50 generated by the lower magnetic coil 47 destructively compensates the permanent magnetic field 37 of the permanent magnets 43. In the lower section 41, the magnetic field strength is preferably lowered to zero or less than 10% of the magnetic field strength in the upper section 39. The current source 51 and the magnetic coils 46, 47 are adapted for the current 48 with the current strength of the first value 70. The first value 70 may be kept constant during the active recovery phase 66.

The controller 12 triggers the end of the active recovery phase 66 based on a forecast of the potential energy of the air spring 23 in the upper turning point 15. The primary actuator 22 is deactivated, for example, when the potential energy will reach a target value without further support by the primary actuator 22. Here, it is considered that at the time 71 of shutting down the primary actuator 22, the potential energy has already reached a part of the target value and the current kinetic energy of the striker 4 up to the upper turning point 15 is converted into the previously missing part of the target value. Conversion losses can be accounted for by a table 72 stored in the controller 12. The target value lies in the range between 25% and 40%, e.g., at least 30%, and, e.g., at most 37% of the impact energy of the striker 4.

A forecasting device 73 continuously compares the operating conditions of the striking mechanism 2. An exemplary forecast is based on a pressure measurement. The forecasting device 73 accesses the signals from the pressure sensor 74. The measured pressure is compared with a threshold value. If the pressure exceeds the threshold value, the forecasting device 73 outputs a control signal 59 to the controller 12. The control signal 59 signals that, for immediate shutdown of the primary actuator 22, the potential energy has reached the target value. The controller 12 terminates the active recovery phase 66.

The forecasting device 73 preferably loads the threshold value from the stored look-up table 72. The lookup table 72 can contain exactly one threshold value. Preferably, however, a plurality of predetermined threshold values are stored for different operating conditions. For example, threshold values for different temperatures in the pneumatic chamber 34 can be stored. The forecasting device 73 also receives a signal from a temperature sensor 75 in addition to the signal from the pressure sensor 74. The threshold value is selected, for example, depending on the latter.

Furthermore, the forecasting device 73 can estimate the speed of the striker 4 from a change in pressure. The lookup table 72 may include different speeds for different threshold values for the current pressure. Since a faster striker 4 tends to compress the air spring 23 more, the threshold value for a higher speed is less than for a slower speed. Selecting the threshold value depending on the speed or the pressure change can improve the reproducibility of the target value.

The end of the active recovery phase 66 is also the beginning of the resting phase 67. The controller 12 sets the setpoint 60 for the electrical current 48 to zero. The switchable magnetic field 38 is switched off and the primary actuator 22 is deactivated. The permanent magnetic field 37 acts upon the striker 4. However, since the permanent magnetic field 37 has a constant field strength running substantially along the axis of movement 3, it exerts little or no force on the striker 4.

Instead of lowering the electrical current 48 to zero, the electrical current 48 may, in the resting phase 67, be set to a negative value relative to the setpoint 60. In this way, the remanence in the striker 4 is reduced. The magnitude of the electrical current 48 is small, for example less than 10%, compared to that of setpoint 60, so as not to interfere with the rearward movement.

During the resting phase 67, the striker 4 is slowed to a standstill by the air spring 23. The potential energy of the air spring 23 is increased further by some of the kinetic energy of the striker 4 before the striker 4 comes to a stop, i.e., reaches the upper turning point 15.

The sequence of the active recovery phase 66 and the resting phase 67 has been shown in the tested structures of the striking mechanism to be highly energy-efficient, especially in switching off the electrical current 48 to zero at the end of the active recovery phase 66. The efficiency of the primary actuator 22 decreases with decreasing distance of the striker 4 from the upper turning point 15. As long as the primary actuator 22 acts efficiently, the striker 4 is accelerated to a high speed. If the forecast shows that the striker 4 has now reached the desired upper turning point 15 without the primary actuator 22, the increasingly inefficiently acting primary actuator 22 is disabled. In the alternative, the electrical current 48 is reduced continuously or in stages to zero. In that case, an adaptive adjustment of the trajectory of the striker 4 for reaching the upper turning point 15 can be made, at the expense of efficiency. Also in the alternative, the resting phase 67 will preferably follow before reaching the upper turning point 15.

The duration of the active recovery phase 66 is derived from the forecast. Depending on the mode of operation or from impact to impact, the duration may vary. For example, if the die 13 does not reach its home position 16 before an impact, in which case the striker 4 must travel a longer path for the next impact. With a fixed duration of the active return phase 66, the kinetic energy absorbed for the striker 4 would not be sufficient against the force of the air spring 23 to the desired upper turning point 15.

The controller 12 triggers the end of the resting phase 67 based on reaching the upper turning point 15. With the end of the resting phase 67, the acceleration phase 68 begins. The controller 12 triggers the start of the acceleration phase 68 on the basis of the reverse movement of the striker 4. A position or motion sensor can directly detect the reversal of movement of the striker 4. Preferably, recognition of the reversal of movement is based indirectly on a change of pressure in the pneumatic chamber 34.

A pressure sensor 74A is coupled to the pneumatic chamber 34. The pressure sensor 74A is, for example, a piezoresistive pressure sensor 74A. The pressure sensor 74A may be located in the pneumatic chamber 34 or may be coupled via an air duct to the pneumatic chamber 34. The pressure sensor 74A is preferably arranged at or in the seal 30. An analysis device 76 is assigned to the pressure sensor 74A. The analysis device 76 monitors a change in pressure in the pneumatic chamber 34. Once the change in pressure takes a negative value, that is, the pressure drops, the analysis device 76 sends a control signal 77 to the controller 12, indicating that the striker 4 has reached the upper turning point 15.

The analysis of the pressure change, due to the process, leads to a slight delay until it is detected that the upper turning point 15 has been reached or passed. The absolute pressure can be detected and compared with a threshold value. When the pressure reaches the threshold value, the output of the control signal 77 is triggered. The pressure in the pneumatic chamber 34 can be measured in the upper turning point 15 and stored as the threshold value in a table of the analysis device 76. The threshold value can be stored as a function of various operating conditions, particularly the temperature in the pneumatic chamber 34. The analysis device 76 determines the present operating condition, for example by querying a temperature sensor, and reads the corresponding threshold value from the table. The two methods can be redundantly combined and separated from each other to output the control signal 77.

The controller 12 starts the acceleration phase 68 when the control signal 77 is received. The controller 12 sets the target value 60 for the electrical current 48 to a second value 78. The sign of the second value 78 is chosen such that the lower magnetic field 50 of the lower magnetic coil 47 is constructively super-positioned with the permanent magnetic field 37 within the guide tube 27. This results in a high field strength in the lower section 41 of the guide tube 27. The electrical current 48 is fed during the acceleration phase 68 into the lower magnetic coil 47, and preferably into the upper magnetic coil 46. The permanent magnetic field 37 in the upper section 39 is preferably attenuated by the magnetic field 38 of the upper magnetic coil 46 within the guide tube 27 or completely destructively equalized. The striker 4 is pulled into the stronger magnetic field in the lower section 41. The striker 4 undergoes continuous acceleration in the direction of impact 5 during the acceleration phase 68. The kinetic energy reached up to the point of impact 14 is about the same as the impact energy of the striker 4.

An alternative or additional determination of whether the upper turning point 15 has been reached, is based on a change in the induced voltage of the upper magnetic coil 46 due to the movement of the striker 4. The striker 4 may overlap with the upper yoke ring 56 before reaching the upper turning point 15. The magnetic field 49 flows in upper region 39 nearly closed without an air gap, over the striker 4 into the upper yoke ring 56. The magnetic field 50 flows in the lower region 41 through a large air gap to the lower yoke ring 57. During the movement of the striker 4 to the turning point 15, the air gap in the lower region 41 is further increased, whereby the magnetic flux is increased proportionally in the upper region. Once the striker 4 reverses at the turning point 15, the proportion of the magnetic flux in the upper region 39 is reduced. The change of the magnetic flux induces a voltage in the upper magnetic coil 46. Characteristic of the turning point 15 is a change of the sign of the induced voltage. The electrical current source 51 preferably controls the electrical current 48 to zero before it reaches the turning point 15 in order to maintain the resting phase 67. The control loop adjusts continuously to the control value 64 so as to hold the electrical current 48 from the induced voltage at zero. In case of a change of the sign of the induced voltage, the control loop 62 reacts with a significantly larger control variable 64. The control signal 77 can thus, for example, be triggered by the control variable 64 exceeding the threshold value.

The amount of the second value 78 is preferably adjusted so that the upper magnetic field 49 precisely destructively compensates the permanent magnetic field 37 or lowers it to at least 10% of the field strength. The electrical current 48 in the magnetic coils 46, 47 rises to the setpoint 60 at the start of the acceleration phase 68. A switching edge is specified, for example, only by a time constant, which is due to the inductance of the coils 46, 47 and the reaction of the striker. The controller 12 preferably continuously maintains the setpoint 60 during the acceleration phase 68 at the second value 78.

The air spring 23 supports the acceleration of the striker 4 in the direction of impact 5. In this case, the potential energy stored in the air spring 23 is largely converted into kinetic energy by the striker 4. At the point of impact 14, the air spring 23 is preferably completely relaxed. Near the point of impact 14, the ventilation opening 36 is released by the striker 4. The ventilation opening 36 leads to a weakening of the air spring 23 without completely reducing its effect on the striker 4 to zero. By this time, the air spring 23 has already transmitted significantly more than 90% of its potential energy to the striker 4.

The controller 12 will trigger the end of the acceleration phase 68 based on an increase 79 of the electrical current 48 in the lower magnetic coil 47 and of the input electrical current 51 from the current source 48. While the striker 4 moves, due to the electromagnetic induction from the lower magnetic coil 47, a voltage drop occurs, against which the current source 51 feeds the electrical current 48. With the impact and the standing striker 4, the voltage drop disappears on impact. The electrical current 48 is increased for a short time until the regulated current source 51 re-regulates the electrical current 48 to the setpoint 60.

A current sensor 80 can detect rotating electrical current 48 in the lower magnetic coil 47. An associated discriminator 81 compares the measured current 48 to a threshold, and if the threshold value is exceeded, a final signal 82 is output. The final signal 82 indicates to the controller 12 that the striker 4 has struck the die 13. The threshold value is selected, for example, depending on the second value 78, i.e., the setpoint 60 for the acceleration phase 68. The threshold value may be 5% to 10% greater than the second value 78. Alternatively, or in addition to a detection of the absolute current 48, a rate of change of the electrical current 48 can be detected with the current sensor 80 and with the discriminator 81 compared to a threshold value for the rate of change.

The current source 51 with its control loop 61 acts against the increase 79 of the electrical current 48 in the electrical circuit 83. Here, the control variable 64 changes. Instead of or in addition to a change in the electrical current 48, the control variable 64 can also be monitored. The absolute value or preferably a rate of change in the control variable 64 can be compared with a threshold value, in response to which the final signal 82 is output.

On receipt of the final signal 82, the controller 12 ends the acceleration phase 68. The setpoint 60 is set to zero. Accordingly, the current output of the current source 51 drops to an electrical current 48 that is equal to zero. The striker 4 is not accelerated further in the direction of impact 5.

The controller 12 immediately after the acceleration phase 68 or after a pause can begin the next active recovery phase 66.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A machine tool, comprising:
    a tool holder, wherein a chiseling tool is holdable in the tool holder such that the chiseling tool is movable along an axis of movement;
    an actuator arranged around the axis of movement and comprising a first magnetic coil and a second magnetic coil; and
    a striking mechanism disposed within the actuator, wherein the striking mechanism includes an air spring, a striker, and a die;
    wherein the air spring has a ventilation opening which is only open when the striker is in close proximity to the die.

2. The machine tool according to claim 1, wherein the ventilation opening is arranged at an end of the first magnetic coil in a direction toward the tool holder and wherein the first magnetic coil is disposed further from the tool holder than is the second magnetic coil.

3. The machine tool according to claim 1, wherein the ventilation opening has a surface cross-section such that at most 10% of the air in the air spring flows through the ventilation opening in one second.

4. The machine tool according to claim 1, wherein the air spring is closed by a stationary seal at an end of the air spring disposed opposite from the tool holder.

5. The machine tool according to claim 1, wherein a permanent and radially magnetized ring magnet is arranged between the first magnetic coil and the second magnetic coil.

6. The machine tool according to claim 5, wherein the ring magnet is comprised of a plurality of permanent magnets which are each aligned with a first magnetic pole facing the axis of movement and a second magnetic pole facing away from the axis of movement.

7. The machine tool according to claim 6:
    wherein the first and second magnetic coils are each controlled in alternating first and second phases by a controller;
    wherein a first magnetic field generated by the first magnetic coil is destructively super-positioned with a magnetic field of the ring magnet in the first phase and is constructively super-positioned with the magnetic field of the ring magnet in the second phase;
    and wherein a second magnetic field generated by the second magnetic coil is constructively super-positioned with the magnetic field of the ring magnet in the first phase and is destructively super-positioned with the magnetic field of the ring magnet in the second phase.

8. The machine tool according to claim 1, wherein the striker is a soft magnetic material.

9. The machine tool according to claim 1, wherein the die is a soft magnetic material and projects into the second magnetic coil or into a yoke which abuts the second magnetic coil in a direction of impact.

10. The machine tool according to claim 1, wherein the ventilation opening is only open when the striker is at a position that is less than 5% of the stroke of the striker.

11. The machine tool according to claim 1, wherein the close proximity is within 5% of the stroke of the striker.

12. The machine tool according to claim 1, wherein a guide tube is disposed between the actuator and the striking mechanism and wherein the ventilation opening is defined by the guide tube.

13. The machine tool according to claim 12, wherein the ventilation opening is disposed in the guide tube at an end of the first magnetic coil in a direction toward the tool holder.

14. The machine tool according to claim 1, wherein the ventilation opening is the only ventilation opening in the air spring.

* * * * *